(12) United States Patent
Richerson et al.

(10) Patent No.: US 6,790,397 B2
(45) Date of Patent: Sep. 14, 2004

(54) FILTER APPARATUS AND METHODS

(75) Inventors: C. Shaun Richerson, Ardmore, OK (US); Robert Andreae, Yens (CH)

(73) Assignee: Andreae Filters, Inc., Ardmore, OK (US)

( * ) Notice: Subject to any disclaimer, the term of this patent is extended or adjusted under 35 U.S.C. 154(b) by 0 days.

(21) Appl. No.: 10/611,251

(22) Filed: Jun. 30, 2003

(65) Prior Publication Data

US 2004/0088958 A1 May 13, 2004

Related U.S. Application Data

(62) Division of application No. 09/751,222, filed on Dec. 29, 2000, now Pat. No. 6,585,793.

(51) Int. Cl.[7] ........................ B29D 16/00; B01D 46/52; B01D 45/04
(52) U.S. Cl. ............... 264/154; 264/138; 264/DIG. 48; 55/442; 55/521; 55/DIG. 5
(58) Field of Search ................................. 493/356, 941; 156/60, 205, 207, 210, 211, 1; 55/521, 442, 443, 444, 445, 446, 486, 487, 488, 489, 500, 529, DIG. 5, DIG. 12, DIG. 46, 385.1, 527, 528; 264/138, 154, DIG. 48; 83/23

(56) References Cited

U.S. PATENT DOCUMENTS

| | | | | |
|---|---|---|---|---|
| 1,807,378 A | 5/1931 | Budil | ........................ | 55/446 |
| 2,227,385 A | 12/1940 | Benedict | ...................... | 55/521 |
| 3,075,337 A | 1/1963 | Andreae | ...................... | 55/446 |
| 3,198,336 A | 8/1965 | Hyslop | ........................ | 55/521 |
| 3,440,807 A | 4/1969 | Gaines, Jr. | ................... | 55/497 |
| 3,620,375 A | 11/1971 | Atkins | ........................ | 210/484 |
| 3,883,331 A | 5/1975 | Bernard et al. | ............... | 55/521 |
| 4,008,060 A | 2/1977 | Andreae | ...................... | 55/446 |
| 4,799,944 A * | 1/1989 | Dixon et al. | .................. | 55/446 |
| 5,051,118 A | 9/1991 | Andreae | ...................... | 55/97 |
| 5,059,218 A | 10/1991 | Pick | ............................ | 55/131 |
| 5,128,039 A | 7/1992 | Gabrielson | .................. | 210/450 |
| 5,145,500 A | 9/1992 | Nolen, Jr. | .................... | 55/501 |
| 5,252,111 A | 10/1993 | Spencer et al. | .............. | 55/489 |
| 5,273,564 A | 12/1993 | Hill | ............................ | 55/493 |
| 5,743,927 A | 4/1998 | Osendorf | ..................... | 55/497 |
| 5,779,747 A | 7/1998 | Schlör et al. | ................. | 55/497 |
| 6,165,242 A | 12/2000 | Choi | ........................... | 55/521 |
| 6,328,778 B1 | 12/2001 | Richerson et al. | ............ | 55/521 |
| 6,585,793 B2 * | 7/2003 | Richerson et al. | ............ | 55/521 |

FOREIGN PATENT DOCUMENTS

| | | |
|---|---|---|
| CA | 454584 | 2/1949 |
| DE | 35 45 422 | 7/1987 |

OTHER PUBLICATIONS

Brochure of Andreae Filters, Inc. entitled "Andreae® Standard Andreae® HE+ Andreae® Hydro Filters" (undated but admitted to be prior art).

* cited by examiner

*Primary Examiner*—Duane Smith
*Assistant Examiner*—Jason M. Greene
(74) *Attorney, Agent, or Firm*—McAfee & Taft

(57) ABSTRACT

The invention provides a filter apparatus for removing air entrained particles comprising a pleated filter media. A first media member has a plurality of alternating upstream and downstream folds and a wall connecting the folds. A pair of slits forms an aperture and a hinged pleat. A second media member matingly attaches to the first media member.

20 Claims, 2 Drawing Sheets

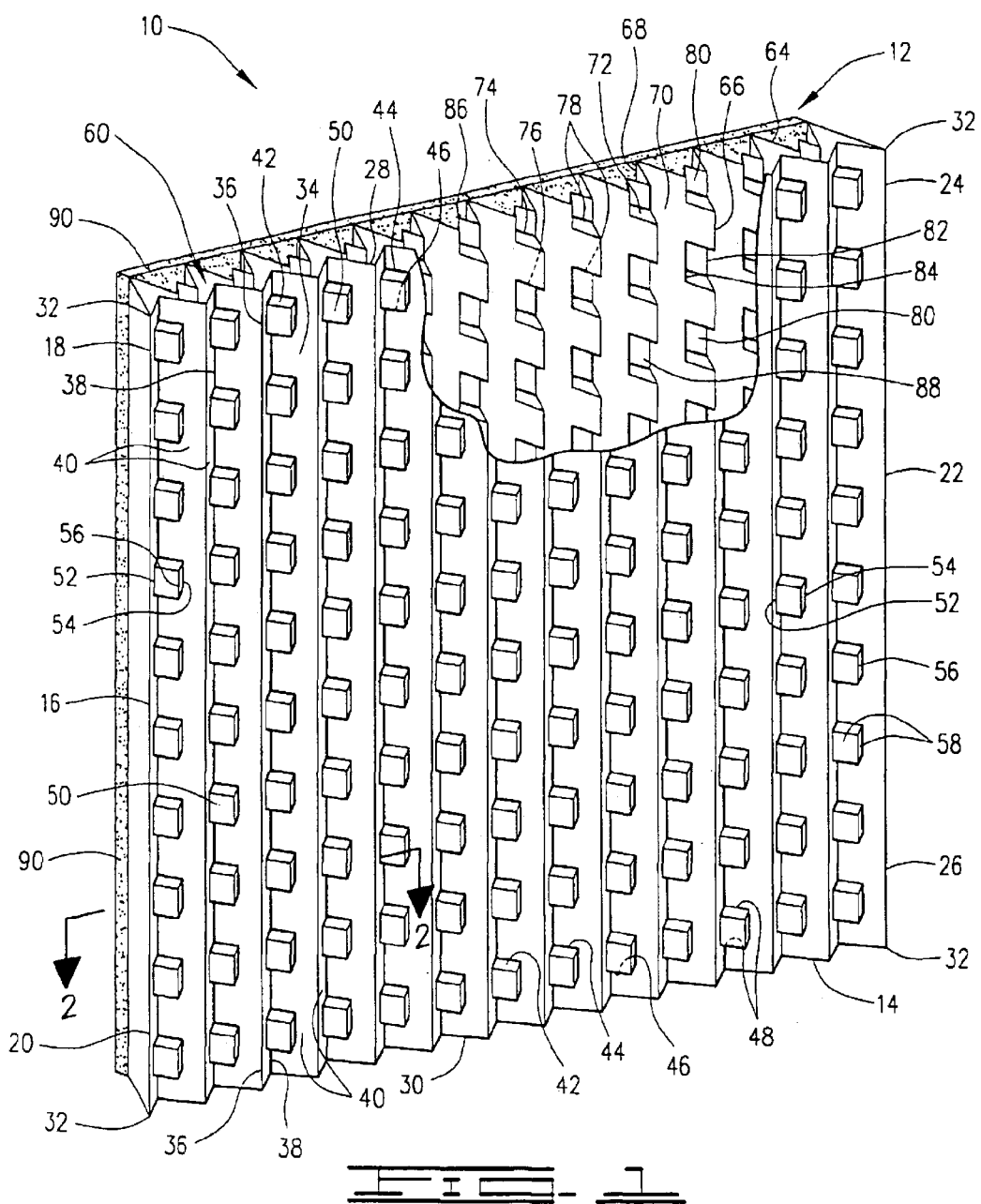

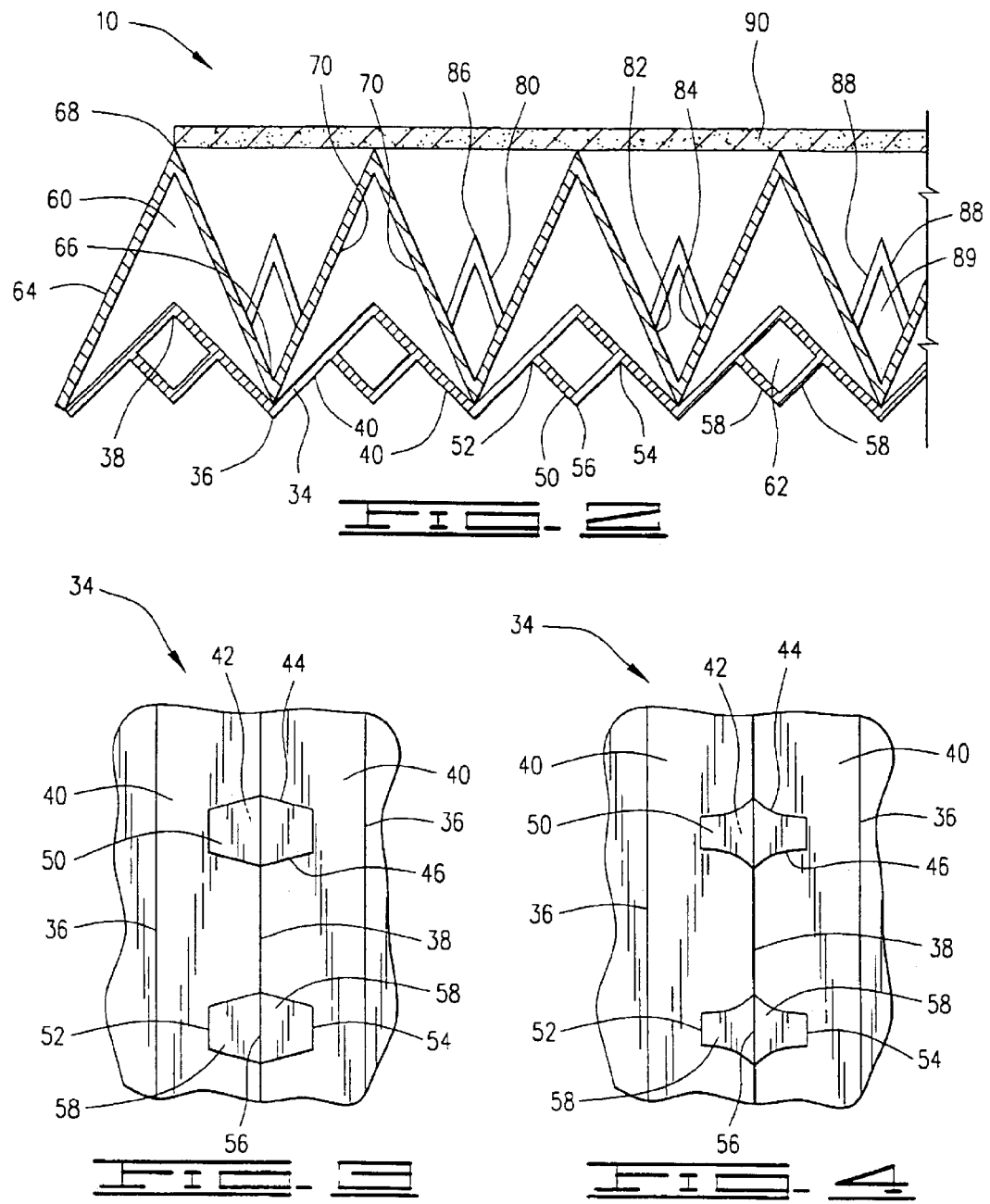

FILTER APPARATUS AND METHODS

This application is a divisional of application No. 09/751,222, filed on Dec. 29, 2000 now U.S. Pat. No. 6,585,793.

BACKGROUND OF THE INVENTION

This invention relates generally to filters and methods and more particularly, but not by way of limitation, to filter apparatus and methods for removing particulates from an airstream adapted for use in a paint booth.

Filters, including air filters, are used for a variety of applications. Generally, an air filter fits in a housing and has a filter media which removes undesired particles from a fluid, typically an airstream. Depending on its specific application, the filter media is adapted to remove dust, dirt, paint, fumes and/or other particles.

In paint booths, i.e., paint overspray control or paint arrester applications, a filter is placed in the exhaust airstream of the paint booth or similar structure. Paint spray residual that does not adhere to the article being painted is entrained in the airstream of the exhaust exiting the paint booth. The airstream passes through the filter positioned at an air intake before it is exhausted into the environment.

Generally in paint booths and similar applications, a few types of filters are commonly used. One is a rigid, non-collapsible, framed filter. The framed filter is designed to fit snugly in the modular frame of the exhaust airstream of the paint booth. A rear supporting grid either built into the filter or placed behind the filter in the modular frame is used to prevent the filter from being drawn through the modular frame into the exhaust duct. Another type of filter is a frameless accordion-type filter media typically manufactured in long sections, i.e., twenty to thirty feet long and cut to length to fit a particular modular frame of the paint booth. The expandable/collapsible filter medium is formed of paperboard, cardboard and/or honeycomb to create an inexpensive and effective filter means. The filter is cut and a rear supporting grid is typically used to secure the filter. Clips or wire fasteners are used to secure the edges of the filter to the modular frame of the air intake.

Another commonly used filter is a corrugated paper baffle type filter. This type of filter typically has one to three filter media layers. The media layers often have a plurality of voids or holes disposed through the media layers. Air carrying particulates is routed through the voids and the particulates are deposited on the media layers. Examples of these types of filters include U.S. Pat. Nos. 3,075,337, 4,008,060 and 5,051,118, which patents are incorporated by reference herein.

While many of these prior art filters work well for their intended application, a cone of the particulate will sometimes form on a secondary media layer directly behind a hole in the first media layer, which is referred to as "loading." These cones of particulate, or loading, reduce the life and efficiency of the filter. Also, a great deal of waste in the form of disks or chads is generated by creating the voids or holes in the filter media. Moreover, it is believed that the overall particulate efficiency and holding efficiency can be improved as compared to the prior art filters.

Thus, there is a need for improved filter apparatus and methods which reduce loading, are voidless, can be efficiently manufactured, can improve overall particulate and have improved holding efficiency.

SUMMARY OF THE INVENTION

The present invention provides improved filter apparatus which meet the needs described above.

The invention includes a filter apparatus and method for removing air entrained particulates. A first media member has a pair of upstream folds and a downstream fold interposed between the pair of upstream folds. A wall connects each of the pair of upstream folds to the downstream folds. An aperture is positioned on the wall between the pair of upstream folds and a pleat is hinged to an edge of the aperture.

The invention also includes a filter apparatus and method having a first media member. The first media member has a plurality of alternating upstream folds and downstream folds and a wall connecting the upstream folds to the downstream folds. A pair of slits is cut to the wall and across the downstream folds such that the first media member is voidless in a flat state and such that the pair of slits forms an aperture with a pleat at least partially covering the aperture in a corrugated state.

The invention further includes a method of forming a filter for removing air entrained particulates comprising providing a voidless first media member having a plurality of alternating upstream folds and downstream folds and a wall connecting the upstream folds to the downstream folds. The method also includes cutting a plurality of pairs of slits through the wall and across the downstream folds.

It is therefore a general object of the present invention to provide improved filter apparatus and methods. Other and further objects, features and advantages of the present invention will be readily apparent to those skilled in the art upon a reading of the following disclosure when taken in conjunction with the accompanying drawings.

BRIEF DESCRIPTION OF THE DRAWINGS

FIG. 1 is a partially cutaway front perspective view of the apparatus of the present invention.

FIG. 2 is a sectional view along lines 2—2 of FIG. 1.

FIG. 3 is a front elevation view of an alternate embodiment of a pleat of the apparatus of the present invention.

FIG. 4 is a front elevation view of another alternate embodiment of a pleat of the present invention.

DETAILED DESCRIPTION OF THE PREFERRED EMBODIMENTS

Referring to the drawings, presently preferred embodiments of the invention and their operation are illustrated. Like reference numerals generally refer to like parts throughout the drawings and this description.

Directional terms—specifically including but not limited to upper, lower, top, bottom, upstream, downstream, left and right—have been used throughout the specification and claims. These directional terms have been used solely for clarity in describing the application and do not limit the invention to any specific orientation. In other words, filter apparatus 10 of the present invention can be rotated about any of its axes and still function as intended.

Referring to FIG. 1, the filter apparatus of the present invention is shown and designated generally by the numeral 10. Apparatus 10 has a filter media 12 for removing particulates from a fluid flow such as an airstream. Filter media 12 is preferably a rectangular shaped accordion-type, multi-ply corrugated filter which separates particles from an airstream by inertia.

Referring to FIGS. 1 and 2, filter media 12 has a periphery 14. Periphery 14 includes a first end 16 which has an upper portion 18 and a lower portion 20. Periphery 14 of filter media 12 also includes a second end 22 which is substantially parallel to first end 16. Second end 22 has an upper portion 24 and a lower portion 26. Periphery 14 of filter media 12 also has a top 28 substantially parallel to a bottom 30. Opposite ends of top 28 connect with upper portion 18 of first end 16 and to upper portion 24 of second end 22, respectively. Similarly, opposite ends of bottom 30 connect to lower portion 20 of first end 16 and to lower portion 26 of second end 22, respectively. The junctions of ends 16, 22, top 28 and bottom 30 form four corners 32 at approximate right angles such that filter media 12 is substantially rectangular in shape.

Filter media 12 has a first media member or upstream wall 34. First media member 34 has upstream folds 36 which are substantially parallel and extend from top 28 to bottom 30 of periphery 14 of filter media 12. First media member 34 also has downstream folds 38 which are substantially parallel and extend from top 28 to bottom 30 of periphery 14 of filter media 12. First media member 34 has walls 40 extending from top 28 to bottom 30 which connect upstream folds 36 and downstream folds 38.

First media member 34 has a plurality of apertures 42 disposed therethrough. Preferably, apertures 42 are rectangular, are located perpendicular to and upon downstream folds 38 and are vertically and horizontally aligned as shown in FIG. 1. Most preferably, apertures 42 are formed by a first slit 44 and a second slit 46, which together form a pair of slits 48, through walls 40 and straddling downstream fold 38.

When first media member 34 is in a corrugated state as shown in FIG. 1, each pair of slits 48 forms an aperture 42 and a pleat 50 which extends above aperture 42. Pleat 50 is hinged to the periphery of aperture 42. In a preferred embodiment, hinge means for hinging pleat 50 to a perimeter of aperture 42 has a first hinge portion 52 and a second hinge portion 54. Pleat 50 has a downstream fold portion 56 which is reversed or inverted relative to downstream fold 38 such that the downstream fold portion 56 of pleat 50 projects in the same direction as upstream folds 36. Pleat 50 also has a wall portion 58 between each hinge portion 52, 54 and downstream fold portion. Pleat 50 acts to redirect the airflow into the filter so that the air does not flow directly through first media member 34 and impact the structure directly behind aperture 42.

In a preferred embodiment, pleat 50 is rectangular in shape, i.e., virtually identical in shape to aperture 42. However, as shown in FIGS. 3 and 4, pleats 50 may be shaped non-rectangular such that hinge portion 52, 54 is a different length, i.e., shorter or longer, than downstream fold portion 56. It is believed that variations to the shape of pleats 50 may impact the airflow through the filter and thus the particulate and holding efficiency of the filter. As with pleats 50, the shape of pleats 80 (discussed infra) may also be varied.

When first media member 34 is in a flat state, i.e., when first media member 34 is flat, first media member 34 is voidless. Voidless as defined herein means that in a flat state no voids exist (excepting and distinguishing slits 44, 46). Thus, the manufacture of first media member 34 does not produce waste in the form of material that fills apertures 42.

A second media member 64 is attached in complementary relationship with first media member 34. Similar to the structure of first media member 34, second media member 64 has upstream creases 66 and downstream creases 68 extending from top 28 to bottom 30. Upstream creases 66 and downstream creases 68 are connected by secondary walls 70.

Second media member 64 has a plurality of secondary apertures 72 disposed therethrough. Preferably, secondary apertures 72 are rectangular, are located perpendicular to and upon upstream creases 66 and are vertically and horizontally aligned as shown in FIG. 1. Most preferably, secondary apertures 72 are formed by a first secondary slit 74 and a second secondary slit 76, which together form a pair of secondary slits 78, through secondary walls 70 and straddling upstream crease 66.

When second media member 64 is in a corrugated state as shown in FIG. 1, each pair of secondary slits 78 forms a secondary aperture 72 in a secondary pleat 80 which extends above secondary aperture 72. Secondary pleat 80 is hinged to the periphery of secondary aperture 72. In a preferred embodiment, hinge means for hinging secondary pleat 80 to a perimeter of secondary aperture 72 has a first secondary hinge portion 82 and a second secondary hinge portion 84. Secondary pleat 80 has an upstream crease portion 86 which is inverted or reversed relative to the upstream crease 66 such that upstream crease portion 86 of secondary pleat 80 projects in the same direction as downstream creases 68. Secondary pleat 80 also has a secondary wall portion 88 between the secondary hinge portion 82, 84 and upstream crease portion 86.

First media member 34 and second media member 64 are positioned in a complementary relationship with each other. Upstream folds 36 of first media member 34 are aligned with upstream creases 66 of second media member 64. Similarly, downstream folds 38 of first media member 34 are aligned with downstream creases 68 of second media member 64. First media member 34 and second media member 64 are attached by any suitable means including glue, staples and other bonding means. In a preferred embodiment, the front of upstream creases 66 of second media member 64 is glued to the back of upstream folds 36 of first media member 34.

In a preferred embodiment, secondary walls 70 of second media member 64 are wider than walls 40 of first media member 34 such that V-shaped baffles 60 are created between first media member 34 and second media member. 64, i.e., between walls 40 of first media member 34 and secondary walls 70 of second media member 64. Also in a preferred embodiment, as best seen in FIG. 2, pleat 50 and a border around aperture 42 form a diamond shape 62 (and pleat 80 and a border around secondary aperture 72 form a diamond shape 89).

When first media member 34 and second media member 64 are attached, apertures 42 of first media member 34 are offset from secondary apertures 72 in second media member 64. Most preferably, apertures 42 and secondary apertures 72 are offset in both vertical and horizontal directions. The offset orientation of apertures 42 and secondary apertures 72 creates a greater swirling effect on the particle-laden airstream such that the particles are deposited on the first and second media members 34, 64 such that substantially clean free air exits through the rear of the filter.

In a preferred embodiment, first media member 34 and second media member 64 are each formed of a single piece of 47 pound per msf (1000 square feet) linerboard. In high moisture environments, 53 pound linerboard forms first media member 34 and 47 pound linerboard forms second media member 64. However, many materials are suitable as the filter media of the present invention, specifically including but not limited to cardboard, fiber weave, mesh, polyester, fiberglass, aluminum and combinations thereof Moreover, a variety of linerboard/paperboard weights and treatments, i.e., moisture and flame resistant coatings, may be used for different applications.

In addition to first and second media members 34, 64, additional media members can be added, i.e., such as third and fourth media members to improve the efficiency of removing particles in the airstream. As illustrated in FIGS. 1 and 2, a third media member 90 attaches to the back of downstream crease 68. In this preferred embodiment, third media member 90 is formed of a polyester mesh. However, additional media members can also be formed of a variety of filter materials. In another alternate embodiment, first media member 34 is formed of linerboard as previously described and second media member 64 is formed of thin polyester material as described in U.S. Pat. No. 5,051,118.

Apparatus 10 is formed by providing a voidless first media member 12, preferably in the form of a continuous roll of linerboard material. A plurality of alternating upstream folds 36 and downstream folds 38 are created in the first media member 34. A plurality of pairs of slits 48 is cut through the wall 40 and across downstream fold 38. First media member 34 is partially collapsed to a corrugated state as shown in FIGS. 1 and 2 and the downstream fold 38 between each pair of slits 48 is inverted. When the downstream fold 38 is inverted, pleat 50 is formed and hinged to the perimeter of aperture 42.

The second media member 64 is similarly created except that the secondary apertures 72 are preferably located across upstream creases 66. First media member 34 and second media member 64 are matingly attached such that the upstream folds 36 abut and attach to upstream creases 66. An optional third media member 90 formed of polyester, cotton, fiberglass, or other filtering mesh may be attached to the back of downstream crease 68 of the second media member 64.

Filter apparatus 10 may be shipped and stored in a collapsed state, that is, with walls 40 abutting. When ready for use, filter apparatus 10 is configured to a corrugated state by pulling first end 16 and second end 22 of periphery 14 in opposite directions. The filter apparatus 10 is then placed in a modular frame of a paint booth fitted for the particular size of filter apparatus 10, or the filter apparatus 10 is cut to fit the modular frame. Filter apparatus 10 is secured as necessary to the modular frame of the paint booth with clips.

In operation, an airstream containing undesired particles such as paint particles is pulled toward filter apparatus 10. The airstream passes through air entrance means (apertures 42) of first media member 34 and then through the air exit means, i.e., secondary apertures 72 of second media member 64, with the particles being deposited in various locations of first media member 34 and second media member 64. The filtered air may pass through one or more second stage filter systems—typically dense polyester weave filters—before the airstream, now substantially free of particles, passes through the exhaust of the filter unit into the environment. When filter apparatus 10 is full or loaded with particles, filter apparatus 10 is suitably discarded.

The present invention has resulted in new and unexpected results. Preliminary tests indicate an improved overall particulate efficiency of 15% and an improved holding efficiency of 15%. Pleats 50 also appear to reduce loading such that cone-shaped deposits do not form beneath apertures 42, thereby extending the useful life of the filter.

Thus, the present invention is well adapted to carry out the objects and attain the ends and advantages mentioned as well as those inherent therein. While preferred embodiments of the present invention have been illustrated for the purpose of the present disclosure, changes in the arrangement and construction of parts and the performance of steps can be made by those skilled in the art, which changes are encompassed within the scope and spirit of the present invention as defined by the appended claims.

What is claimed is:

1. A method of forming a filter for removing air entrained particulates comprising:
   providing a voidless first media member comprising:
      a plurality of alternating upstream folds and downstream folds; and
      a wall connecting the upstream folds to the downstream folds; cutting a plurality of pairs of slits through the wall and across the downstream fold; partially collapsing the first media member to a corrugated state; and inverting the downstream fold between each pair of slits.

2. The method of claim 1 wherein the inverting step forms an aperture with a pleat for redirecting an airflow through the aperture.

3. The method of claim 2 wherein the pleat is hinged to the perimeter of the aperture.

4. The method of claim 3 further comprising:
   providing a second media member comprising:
      a plurality of alternating upstream creases and downstream creases; and
      a secondary wall connecting the upstream creases to the downstream creases; and
   forming a plurality of air exit means for allowing air to pass through the second media member.

5. The method of claim 4 wherein the forming step comprises cutting a plurality of pairs of secondary slits through the secondary wall across the upstream creases.

6. The method of claim 5 further comprising:
   partially collapsing the second media member to a corrugated state; and
   reversing the upstream crease between each pair of secondary slits.

7. The method of claim 6 wherein the reversing step forms a secondary aperture with a secondary pleat for redirecting the airflow through the secondary aperture.

8. The method of claim 7 further comprising matingly attaching the first media member to the second media member such that the upstream folds abut and attach to the upstream creases.

9. The method of claim 8 further comprising attaching a third media member formed of polyester mesh to the downstream crease of the second media member.

10. A method of forming a filter:
    providing a voidless first media member comprising:
       a plurality of alternating upstream folds and downstream folds; and
       a wall connecting the upstream folds to the downstream folds;
    cutting a plurality of pairs of slits across the downstream fold; and
    inverting the downstream fold between each pair of slits.

11. The method of claim 10 wherein the step of inverting further comprises partially collapsing the first media member to a corrugated state.

12. The method of claim 10 wherein the inverting step forms an aperture with a pleat for redirecting an airflow through the aperture.

13. The method of claim 12 wherein the pleat is hinged to the perimeter of the aperture.

14. The method of claim 13 further comprising:
    providing a second media member comprising:
       a plurality of alternating upstream creases and downstream creases; and a secondary wall connecting the upstream creases to the downstream creases; and forming a plurality of air exit means for allowing air to pass through the second media member.

15. The method of claim 14 wherein the forming step comprises cutting a plurality of pairs of secondary slits through the secondary wall across the upstream creases.

16. The method of claim 15 further comprising:

partially collapsing the second media member to a corrugated state; and reversing the upstream crease between each pair of secondary slits.

17. A method of forming a filter for removing air entrained particulates comprising:

providing a voidless first media member comprising:
a plurality of alternating upstream folds and downstream folds; and
a wall connecting the upstream folds to the downstream folds; and cutting a pair of slits through the wall and across the downstream fold such that the first media member is voidless in a flat state and such that the pair of slits forms an aperture with a pleat at least partially covering the aperture in a corrugated state.

18. The method of claim 17 further comprising inverting the downstream fold between each pair of slits.

19. The method of claim 18 wherein the step of inverting further comprises partially collapsing the first media member to a corrugated state.

20. The method of claim 17 wherein the first media member further comprises hinge means for connecting the pleat to a perimeter of the aperture.

* * * * *

UNITED STATES PATENT AND TRADEMARK OFFICE
CERTIFICATE OF CORRECTION

PATENT NO. : 6,790,397 B2
DATED : September 14, 2004
INVENTOR(S) : C. Shaun Richerson and Robert Andreae It is certified that error appears in the above-identified patent and that said Letters Patent is hereby corrected as shown below:

Column 3,
Line 24, after "folds" delete the period.

Signed and Sealed this

Fifteenth Day of February, 2005

JON W. DUDAS
*Director of the United States Patent and Trademark Office*